US011174918B2

(12) United States Patent
Tamura et al.

(10) Patent No.: US 11,174,918 B2
(45) Date of Patent: Nov. 16, 2021

(54) REDUCTION GEAR (71) Applicant: SUMITOMO HEAVY INDUSTRIES, LTD., Tokyo (JP)

(72) Inventors: Mitsuhiro Tamura, Kanagawa (JP); Akira Yamamoto, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 204 days.

(21) Appl. No.: 16/433,316

(22) Filed: Jun. 6, 2019

(65) Prior Publication Data
US 2019/0390735 A1 Dec. 26, 2019

(30) Foreign Application Priority Data

Jun. 22, 2018 (JP) .............................. JP2018-118460

(51) Int. Cl.
F16H 1/32 (2006.01)
F16H 55/06 (2006.01)
F16C 29/06 (2006.01)

(52) U.S. Cl.
CPC ........... F16H 1/32 (2013.01); F16C 29/0626 (2013.01); F16H 55/06 (2013.01); F16C 2361/61 (2013.01); F16H 2001/325 (2013.01)

(58) Field of Classification Search
CPC . F16H 1/32; F16H 2001/323; F16H 2001/325
USPC ........................................ 475/174, 901, 902
See application file for complete search history.

(56) References Cited

U.S. PATENT DOCUMENTS

| 4,656,891 A | * | 4/1987 | Durand | ..................... F16H 1/32 475/179 |
| 5,536,218 A | * | 7/1996 | Fukaya | ................. F16H 37/041 475/178 |
| 5,564,995 A | * | 10/1996 | Roder | ................... F16C 35/073 475/331 |

(Continued)

FOREIGN PATENT DOCUMENTS

| CN | 104074930 A | * | 10/2014 |
| JP | 2009-150520 A | | 7/2009 |
| JP | 2017044319 A | * | 3/2017 |

OTHER PUBLICATIONS

Wikipedia contributors. (Jun. 6, 2018). Bearing (mechanical). In Wikipedia, The Free Encyclopedia. Retrieved 21:23, Apr. 8, 2021, from https://en.wikipedia.org/w/index.php?title=Bearing_(mechanical) &oldid=844733169 (Year: 2018).*

Primary Examiner — Joseph Brown
(74) Attorney, Agent, or Firm — Michael Best & Friedrich LLP (57) ABSTRACT A reduction gear includes an external gear, an internal gear which meshes with the external gear, a first member which synchronizes with a rotation of the external gear, a second member which synchronizes with a rotation of the internal gear, and a main bearing which is disposed between the first member and the second member, in which one of the first member and the second member is connected to a driven member and the other is fixed to an external member, and the first member, the second member, and the main bearing are formed of a material having a larger Young's modulus and larger specific gravity than those of a material constituting the external gear and the internal gear.

15 Claims, 3 Drawing Sheets (56) References Cited

U.S. PATENT DOCUMENTS

| | | | |
|---|---|---|---|
| 6,450,913 B1* | 9/2002 | Strowik | B60N 2/0224 |
| | | | 475/178 |
| 2005/0255955 A1* | 11/2005 | Arakawa | F16H 1/32 |
| | | | 475/162 |
| 2014/0187373 A1* | 7/2014 | Yamanaka | H02K 11/215 |
| | | | 475/149 |
| 2015/0184584 A1* | 7/2015 | Kuroda | F16H 57/021 |
| | | | 475/149 |
| 2016/0047418 A1* | 2/2016 | Matsui | F16H 1/32 |
| | | | 384/571 |
| 2017/0106543 A1* | 4/2017 | Andoh | F16H 1/32 |
| 2018/0231113 A1* | 8/2018 | Schulz | F16H 1/32 |

* cited by examiner

REDUCTION GEAR

RELATED APPLICATIONS

The contents of Japanese Patent Application No. 2018-118460, on the basis of which priority benefits are claimed in an accompanying application data sheet, is in its entirety incorporated herein by reference.

BACKGROUND

Technical Field

Certain embodiments of the present invention relate to a reduction gear.

Description of Related Art

In the related art, the present applicant discloses a speed reducer including an external gear which is provided radially outside an eccentric body and an internal gear which internally meshes with the external gear.

SUMMARY

According to an aspect of the present invention, there is provided a reduction gear including: an external gear; an internal gear which meshes with the external gear; a first member which synchronizes with a rotation of the external gear; a second member which synchronizes with a rotation of the internal gear; a main bearing which is disposed between the first member and the second member, in which one of the first member and the second member is connected to a driven member and the other is fixed to an external member, and the first member, the second member, and the main bearing are formed of a material having a larger Young's modulus and larger specific gravity than those of a material constituting the external gear and the internal gear.

According to another aspect of the present invention, there is provided a reduction gear including: an external gear; a first internal gear and a second internal gear which mesh with the external gear; a first member which synchronizes with a rotation of the first internal gear; a second member which synchronizes with a rotation of the second internal gear; and a main bearing which is disposed between the first member and the second member, in which one of the first member and the second member is connected to a driven member and the other is fixed to an external member, and the first member, the second member, and the main bearing are formed of a material having a larger Young's modulus and larger specific gravity than those of a material constituting the first internal gear and the second internal gear.

DETAILED DESCRIPTION

In the related art, a speed reducer includes a first flange, a second flange, a frame which covers the internal gear, or the like as main constituent elements, in addition to the external gear and the internal gear. In a reduction mechanism of the related art, the main constituent elements are formed of an iron-based material, and thus, weight of the reduction mechanism tends to increase. In the reduction mechanism, in order to enlarge an application thereof, a reduction in the weight is required. However, if each member is simply formed of a resin in order to reduce the weight, there is a concern that it is not possible to support a moment received from a driven member driven by the speed reducer.

It is desirable to provide a reduction gear capable of reducing weight thereof.

In addition, aspects of the present invention include any combination of the above-described constituent elements or mutual substitution of constituent elements or expressions of the present invention among methods, systems, or the like.

According to the present invention, it is possible to provide a reduction gear capable of reducing weight thereof.

Hereinafter, the present invention will be described based on preferred embodiments with reference to the drawings. In embodiments, comparative examples, and modification examples, the same or equivalent constituent elements and members are assigned by the same reference numerals, and repeated descriptions will be appropriately omitted. In addition, dimensions of members in each drawing are appropriately enlarged and reduced for ease of understanding. Moreover, in each drawing, a part of members which are not important in describing the embodiment in each drawing will be omitted and displayed. In addition, terms including first and second ordinal numbers are used to describe various constituent elements, but the terms are used only for the purpose of distinguishing one constituent element from other constituent elements, and thus, the constituent elements are not limited by the terms.

First Embodiment

Figure 1:
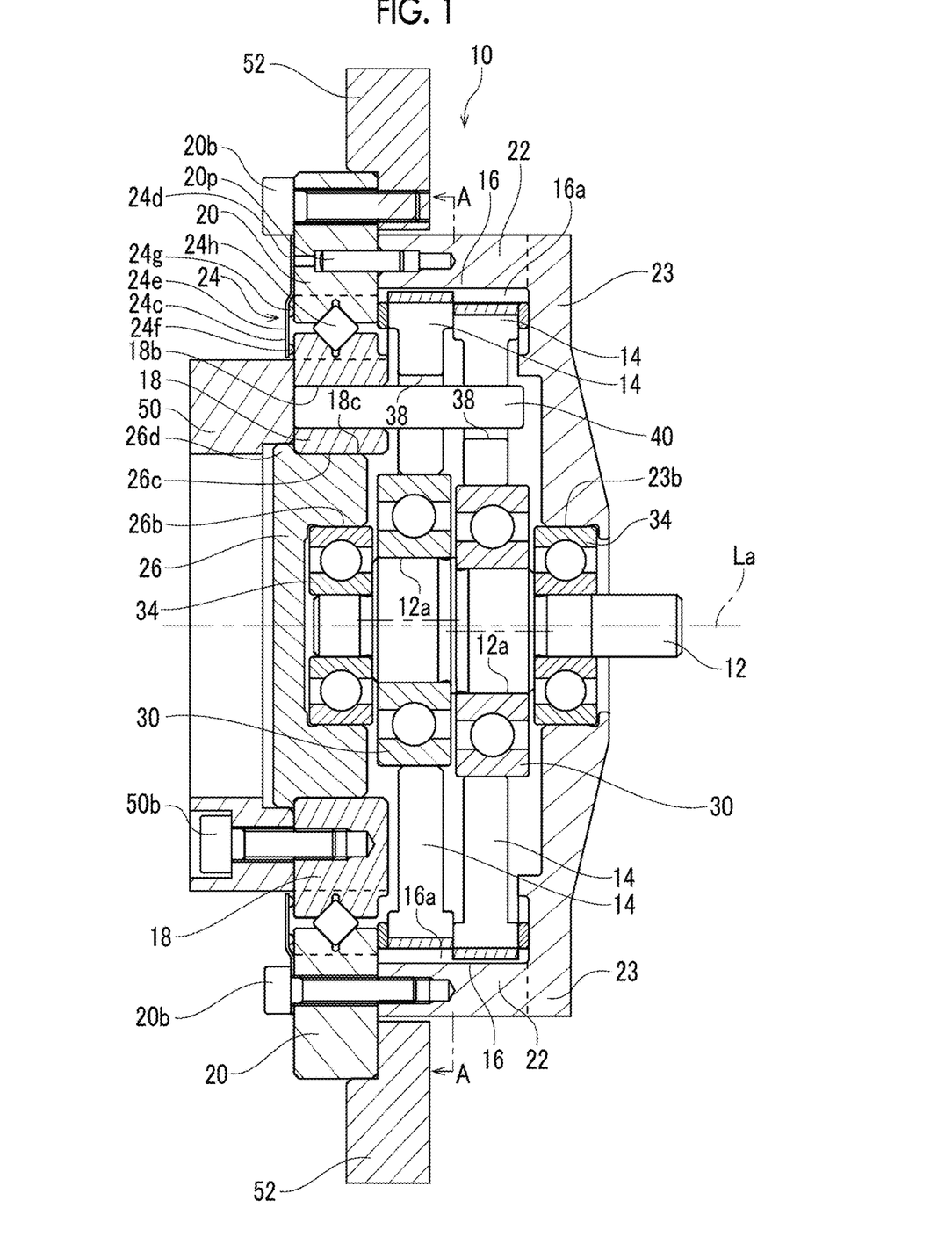
FIG. 1 is a side sectional view showing a reduction gear of a first embodiment.
Figure 2:
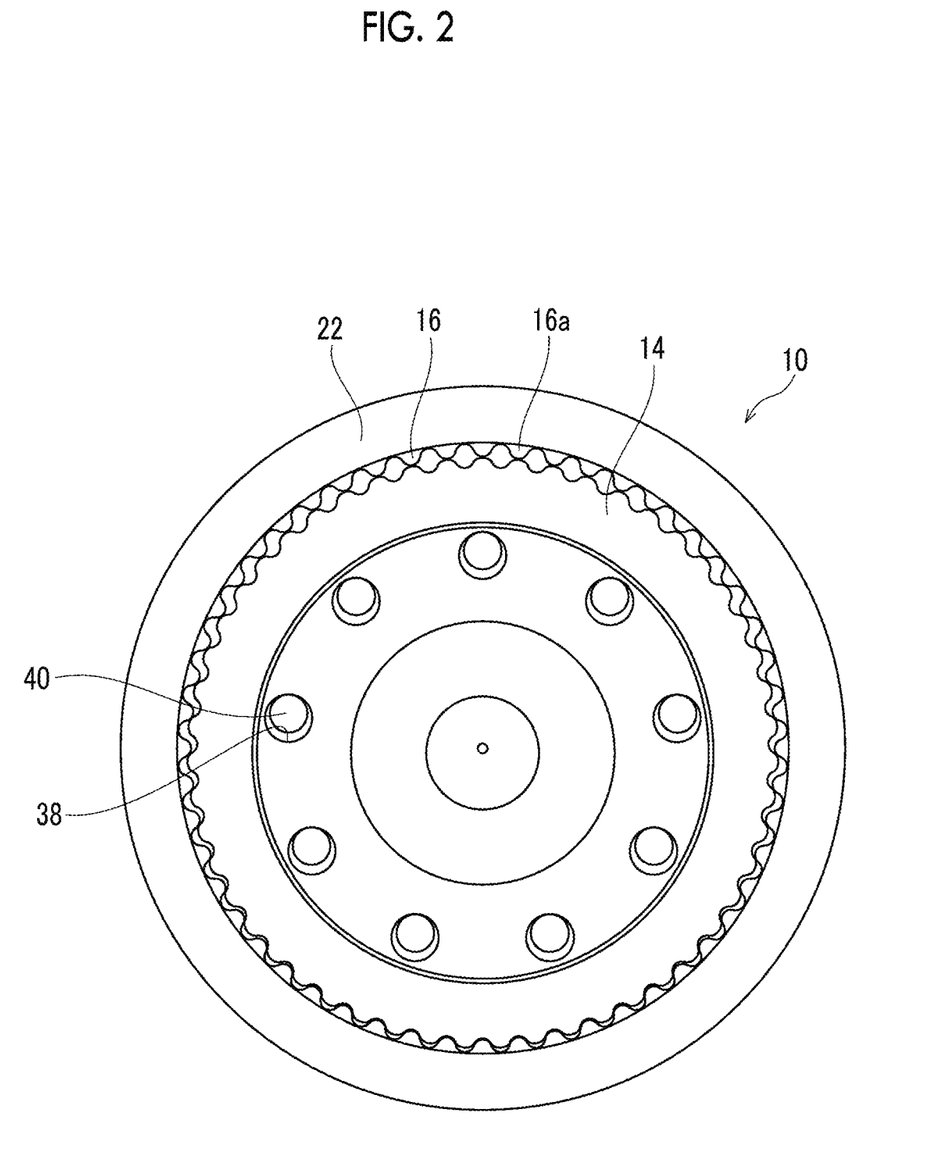
FIG. 2 is a sectional view taken along line A-A of the reduction gear of FIG. 1.

Hereinafter, a configuration of a reduction gear 10 according to a first embodiment will be described with reference to FIGS. 1 and 2. FIG. 1 is a side sectional view showing the reduction gear 10 of the first embodiment. FIG. 2 is a sectional view of the reduction gear 10 taken along line A-A in FIG. 1. In FIG. 2, one of two external gears 14 is shown and the other is not shown for easy understanding. The other external gear 14 is different from the one external gear 14 in that the other external gear is eccentric with a phase difference of 180°, and the other configurations of the other external gear 14 are the same as those of the one external gear. The reduction gear 10 of the present embodiment is an eccentrically oscillating type gear device in which an external gear meshing with an internal gear is oscillated, and thus, a rotation is generated in one of the internal gear and the external gear, and a generated movement component is output from an output member to a driven device. An application of the reduction gear 10 is not particularly limited. However, for example, the reduction gear 10 is incorporated in a joint of a cooperative robot which works in cooperation with a person.

The reduction gear 10 mainly includes an input shaft 12, the external gears 14, an internal gear 16, a first member 18, a second member 20, a third member 26, a casing 22, a cover portion 23, a main bearing 24, and an inner pin 40. The internal gear 16 and the external gear 14 mesh with each other. The first member 18 synchronizes with a rotation of the external gear 14. The second member 20 synchronizes with a rotation of the internal gear 16. The main bearing 24 is disposed between the first member 18 and the second member 20. The third member 26 is integrated inside the first member 18. An input shaft bearing 34 which supports the input shaft 12 is disposed in the third member 26. A material of each member will be described later.

Hereinafter, a direction along a center axis La of the internal gear 16 is referred to as an "axial direction", and a circumferential direction and a radial direction of a circle having the center axis La as a center are referred to as a "circumferential direction" and a "radial direction", respectively. In addition, hereinafter, for convenience, one side (right side in FIG. 1) in the axial direction is referred to as an input side, and the other side (left side in FIG. 1) in the axial direction is referred to as a counter input side (load side).

Input Shaft

The input shaft 12 is rotated around a rotation center line by rotational power input from a drive device (not shown). In the present embodiment, the reduction gear 10 is a center crank type reduction gear in which the rotation center line of the input shaft 12 is provided coaxially with the center axis La of the internal gear 16. For example, the drive device is a motor, a gear motor, an engine, or the like.

In the present embodiment, the input shaft 12 is an eccentric body shaft having a plurality of eccentric portions 12a for oscillating the external gear 14. The input shaft 12 having this configuration may be referred to as a crankshaft. An axis of each eccentric portion 12a is eccentric with respect to the rotation center line of the input shaft 12. In the present embodiment, two eccentric portions 12a are provided, and eccentric phases of the adjacent eccentric portions 12a are shifted by 180°.

The casing 22 is a hollow cylindrical member having internal teeth on an inner periphery thereof. That is, the casing 22 is a member which constitutes the internal gear 16. The cover portion 23 is a disk-shaped member which closes one end of the casing 22 and holds the input shaft bearing 34 supporting the input shaft 12 on the input side. In the present embodiment, the cover portion 23 is integrally formed of the casing 22 and a single material. The cover portion 23 includes a recess 23b which accommodates an outer ring of the input shaft bearing 34 on the input side. In the input shaft 12, an input side thereof is supported by the cover portion 23 through the input shaft bearing 34, and a counter input side thereof is supported by the third member 26 through the input shaft bearing 34. That is, the input shaft 12 is rotatably supported by the first member 18 and the cover portion 23. A configuration of the input shaft bearing 34 is not particularly limited. However, for example, the input shaft bearing is a ball bearing having spherical rolling elements. The input shaft bearing 34 may be pre-pressurized. However, in this example, the input shaft bearing 34 is not pre-pressurized.

External Gear

The external gear 14 is a member which oscillates and rotates based on the rotation of the input shaft 12. The external gear 14 is individually provided corresponding to each of the plurality of eccentric portions 12a. The external gear 14 is rotatably supported by the corresponding eccentric portions 12a via an eccentric bearing 30. Corrugated teeth are formed on the outer periphery of the external gear 14, the teeth move while coming into contact with the internal teeth of the internal gear 16, and thus, the external gear 14 can oscillate in a plane normal to a center axis.

The external gear 14 includes a plurality of inner pin holes 38 provided at positions offset from an axis of the external gear 14. Each inner pin hole 38 is a circular hole which penetrates the external gear 14 from the input side to the counter input side. The inner pin 40 passes through each of the inner pin holes 38. A clearance is provided between the inner pin 40 and the inner pin hole 38 as a play for absorbing the oscillation component of the external gear 14. The inner pin 40 and an inner wall surface of the inner pin hole 38 come into partial contact with each other.

Internal Gear

The internal gear 16 is a member that has internal teeth which mesh with the external gear 14 and rotates relative to the external gear 14 based on the oscillating rotation of the external gear 14. In the present embodiment, internal teeth 16a are integrally formed on an inner peripheral portion of the casing 22. In the present embodiment, the number of the internal teeth 16a of the internal gear 16 is one more than the number of the external teeth of the external gear 14. In addition, the internal gear 16 may have a configuration, in which a plurality of axial pin grooves are formed in the circumferential direction on an inner periphery of the casing (internal gear main body) 22 and an outer pin is (rotatably) disposed in each pin groove such that the outer pins constitute the internal teeth.

First Member

The first member 18 is a member to which power from the external gear 14 is transmitted. The first member 18 is a circular (donut-shaped) member which is disposed on aside portion on the counter input side of the external gear 14 in the axial direction and is provided radially inside the main bearing 24. The first member 18 is rotatably supported by the second member 20 via the main bearing 24. In the present embodiment, a circular opening 18c into which the third member 26 is inserted is provided at a radial center of the first member 18.

Inner Pin

The inner pin 40 is a member which transmits power between the external gear 14 and the first member 18. The present embodiment has a rod-shaped inner pin 40 having a circular cross section. In the inner pin 40 of FIG. 1, an end on the counter input side is press-fitted into a hole 18b of the first member 18. The inner pin 40 may be integrally formed as a portion of the first member 18. The inner pin 40 is inserted into the inner pin holes 38 of the external gear 14 with a clearance. The inner pin 40 abuts against a portion of the inner pin holes 38 formed in the external gear 14, and thus, restricts the rotation of the external gear 14 and allows only the oscillation of the external gear 14. According to this configuration, the first member 18 moves in synchronization with the rotation of the external gear 14.

Second Member

The second member 20 is a member to which power from the internal gear 16 is transmitted, and is fixed to the internal gear 16. In the present embodiment, the second member 20 is a disk-shaped (donut-shaped) member disposed radially outside the first member 18, and is fixed to a side portion on the counter input side of the casing 22 by bolts 20b. According to this configuration, the second member 20 moves in synchronization with the rotation of the internal gear 16. In the example of FIG. 1, a parallel pin 20p is provided between the first member 18 and the casing 22 to position the first member 18 and the casing 22. In addition, the parallel pin 20p is not necessarily provided.

Main Bearing

The main bearing 24 is a bearing mechanism which rotatably supports the first member 18 and the second member 20 relative to each other. The main bearing 24 includes an inner ring, an outer ring, a plurality of rolling elements 24h, a retainer (not shown), and an oil seal 24c. In the present embodiment, the main bearing 24 is a cross roller bearing in which a cylindrical roller is used as the rolling element 24*h*, the inner ring is integrally provided with the first member 18, and the outer ring is integrally provided with the second member 20. That is, grooves for holding the rolling elements 24*h* are formed on an outer peripheral surface of the first member 18 and an inner peripheral surface of the second member 20. The plurality of rolling elements 24*h* are provided at intervals in the circumferential direction. The retainer holds relative positions of the plurality of rolling elements 24*h* and rotatably supports the plurality of rolling elements 24*h*. The oil seal 24*c* is a hollow disk-shaped member which covers a clearance between the outer ring of the main bearing 24 and the counter input side of the inner ring, and functions as an oil seal of the main bearing 24.

Specifically, the oil seal 24*c* has a ring-shaped fixing portion 24*d* which is fixed to the second member 20, a ring-shaped lid portion 24*e* which is integrally provided inside the fixing portion 24*d*, and a first lip 24*f* and a second lip 24*g* which are provided on a side surface of on the main bearing side of the lid portion 24*e* in the axial direction. The fixing portion 24*d* is tightened by the bolts 20*b* so as to be fixed to the second member 20. The lid portion 24*e* is provided to be separated from the first member 18 and the second member 20 in the axial direction in a state where the fixing portion 24*d* is fixed to the second member 20. The first lip 24*f* abuts against an axial end surface of the first member 18 and the second lip 24*g* abuts on an axial end surface of the second member 20. According to this configuration, an axial disposition space of the oil seal 24*c* can decrease compared to a general oil seal.

Third Member

The third member 26 is a member for holding the input shaft bearing 34 which supports the input shaft 12 on the counter input side. An input shaft bearing 34 which supports the input shaft 12 is disposed at the center of the third member 26. The third member 26 may be integrally formed with the first member 18. However, in the present embodiment, the third member 26 is formed separately from the first member 18 and is a circular member which is integrated by being fitted into the opening 18*c* of the first member 18. In the present embodiment, the third member 26 includes a bearing storage portion 26*b*, an outer peripheral portion 26*c*, and a collar portion 26*d*. The bearing storage portion 26*b* is a bottomed recess which is recessed from an input-side end surface of the third member 26 to the counter input side, and stores the outer ring of the input shaft bearing 34 on the counter input side. The outer peripheral portion 26*c* is a cylindrical portion which is fitted into the opening 18*c* of the first member 18 and is fixed to the opening 18*c* by adhesion, interference fit, or the like.

The collar portion 26*d* is a portion which protrudes radially outwardly from the outer peripheral surface on the counter input side of the outer peripheral portion 26*c*, and is configured to come into contact with a side portion on the counter input side of the first member 18. The collar portion 26*d* has a function which keeps the axial position of the third member 26 with respect to the first member 18 constant. The outer peripheral surface of the collar portion 26*d* may be used as a spigot which is fitted with a recess provided in the driven member. The third member 26 having the configuration rotatably supports the input shaft 12 via the input shaft bearing 34. In addition, the third member 26 also functions as a heat dissipation member which promotes heat dissipation of the input shaft 12 and the input shaft bearing 34 whose temperatures are increased by the rotation of the input shaft 12. A load of the third member 26 which receives from the driven member is smaller than a load of the first member 18 which receives from the driven member.

One of the first member 18 and the second member 20 functions as an output member which outputs rotational power to the driven device, and the other functions as a fixed member which is fixed to an external member (for example, a proximal arm of a cooperative robot) 52 for supporting the reduction gear 10. The output member is rotatably supported by the fixed member via the main bearing 24. In the present embodiment, the output member is the first member 18 and the fixed member is the second member 20. A driven member (for example, a distal arm of the cooperative robot) 50 which is rotationally driven by the reduction gear 10 is connected to a side portion on the counter input side of the first member 18 by a bolt 50*b*.

Next, a material which constitutes each component of the present embodiment will be described. In recent years, weight reduction and noise reduction of a speed reducer are desired as application of the reduction gear to a robot or the like which is operated near a people increases. In order to reduce the weight of the reduction gear, it is considered that the component is formed of a material having a low specific gravity. A resin or the like is suitable as the material having a low specific gravity. Meanwhile, according to study of the present inventors, a large moment load is applied to an output portion of the reduction gear used for a joint, it is found that a moment rigidity is insufficient if the component is simply formed of a resin. Therefore, in order to reduce the weight of the speed reducer, it can be said that securing the moment rigidity of the output portion is an issue. Such a problem may occur not only for the reduction gear used for the joint but also for reduction gears for other purposes.

Based on results of these studies, the present inventors have found that the first member 18, the second member 20 and the main bearing 24 are formed of a material having a Young's modulus and a specific gravity larger than those of a material constituting the external gear 14 and the internal gear 16, and thus, both the weight reduction of the speed reducer and securing of the moment rigidity can be obtained. In particular, in order to achieve both the weight reduction and the moment rigidity at a desired level, preferably, the material constituting the first member 18, the second member 20, and the main bearing 24 has ten times or more the Young's modulus compared to that of the material constituting the external gear 14 and the internal gear 16 and 3 time or more the specific gravity compared to that of the material constituting external gear 14 and the internal gear 16.

The material of each member is not particularly limited as long as it can satisfy the above-described conditions. However, in the present embodiment, the first member 18, the second member 20, and the main bearing 24 are formed of an iron-based material, and the external gear 14 and the internal gear 16 (casing 22) are formed a resin. As an iron-based metal used for the first member 18, the second member 20 and the main bearing 24, carbon steel, bearing steel, stainless steel, or the like can be used according to the desired characteristics. Particularly, in the present embodiment, the first member 18, the second member 20, and the main bearing 24 are formed of bearing steel (for example, SUJ2).

Moreover, as the resin used for the external gear 14 and the internal gear 16, various resins can be used according to the desired characteristic. The resin constituting these may be a resin which contains reinforcing fiber such as glass fiber or carbon fiber, may be a resin which does not contain reinforcing fiber, or may be a resin which is impregnated into a base material such as paper or cloth so as to be laminated. In particular, in the present embodiment, the internal gear 16 is formed of PEEK (polyetheretherketone).

In addition, in a case where the internal teeth of the internal gear 16 are constituted by outer pins, the casing (internal gear main body) 22 is formed of a resin. However, the outer pin may be formed of a resin, or may be formed of an iron-based material such as bearing steel.

The external gear 14 is disposed in the vicinity of the input shaft 12 where an increase in temperature is large, and thus, it is desirable that a heat resistance temperature of the external gear 14 is high. From this point of view, the external gear 14 may be formed of a resin having a heat resistant temperature higher than that of the casing 22. In this example, the external gear 14 is formed of PEEK.

From the viewpoint of the weight reduction, the casing 22 and the cover portion 23 may be formed of a resin. The casing 22 and the cover portion 23 may be formed of the same resin, and may be configured of a different resin. In this example, the casing 22 and the cover portion 23 are formed of PEEK. The casing 22 and the cover portion 23 may be formed of other types of resin such as POM (polyacetal).

The input shaft 12 is subjected to a large torsional stress as an eccentric body shaft, and thus, preferably, the input shaft 12 is formed of a material having a rigidity higher than that of the third member 26, and in this example, the input shaft 12 is formed of an iron-based metal. From the viewpoint of the weight reduction, preferably, the third member 26 is formed of a material having a specific gravity lower than that of the first member 18. Further, from the viewpoint of the heat dissipation, preferably, the third member 26 is formed of a material having a thermal conductivity higher than that of a material forming the external gear 14. In order to satisfy these conditions, the third member 26 may be formed of a light metal (a metal having a specific gravity of 4 to 5 or less) such as aluminum, magnesium, beryllium, titanium, or a composite material of these. In this example, the third member 26 is made of a material having a specific gravity smaller than that of the first member 18. Specifically, the third member 26 is formed of aluminum.

In this case, the third member 26 is formed of a material having a specific gravity smaller than that of the material constituting the first member 18, and thus, compared to a case where the third member 26 is formed of a material having a high specific gravity, the weight of the third member 26 can be reduced. In addition, in this case, the third member 26 is formed of the material having a specific gravity larger and a thermal conductivity higher than those of the material constituting the external gear 14, and thus, compared to a case where the third member 26 is formed of a material having a low thermal conductivity, it is possible to increase an allowable rotation speed of the input shaft 12.

A large stress is applied to the inner pin 40, and thus, preferably, the inner pin 40 is formed of a material having a rigidity higher than that of the external gear 14, and in this example, the inner pin 40 is formed of an iron-based metal such as carburized steel.

An operation of the reduction gear 10 having the above-described configuration will be described. If the rotation power is transmitted from the drive device to the input shaft 12, the eccentric portions 12a of the input shaft 12 rotate around the rotation center line passing through the input shaft 12, and the external gears 14 are oscillated by the eccentric portions 12a. In this case, each external gear 14 oscillates such that an axis of the external gear 14 rotates around the rotation center line of the input shaft 12. If the external gears 14 oscillate, meshing positions between the external gears 14 and the internal gear 16 are sequentially shifted. As a result, each time the input shaft 12 rotates once, a rotation of one of the external gear 14 and the internal gear 16 is generated by a difference in the numbers of the teeth between the external gear 14 and the internal gear 16. In the present embodiment, the external gear 14 rotates, and a decelerated rotation is output from the first member 18.

As described above, in the reduction gear 10 of the present embodiment, the first member 18, the second member 20, and the main bearing 24 are formed of the material having a larger Young's modulus and larger specific gravity than those of the material constituting the external gear 14 and the internal gear 16. In this case, compared to the case where each member is simply formed of a resin, it is possible to improve the moment rigidity receiving from the driven member, and it is possible to achieve both the weight reduction and the securing of the moment rigidity. Moreover, the first member 18, the second member 20, and the main bearing 24 are formed of an iron-based material, and the external gear 14 and the internal gear 16 are formed of a resin. Accordingly, it is possible to obtain ten times or more the Young's modulus and three times or more the specific gravity. In this case, it is possible to further improve the moment rigidity. Hereinbefore, the first embodiment is described.

Second Embodiment

Figure 3:
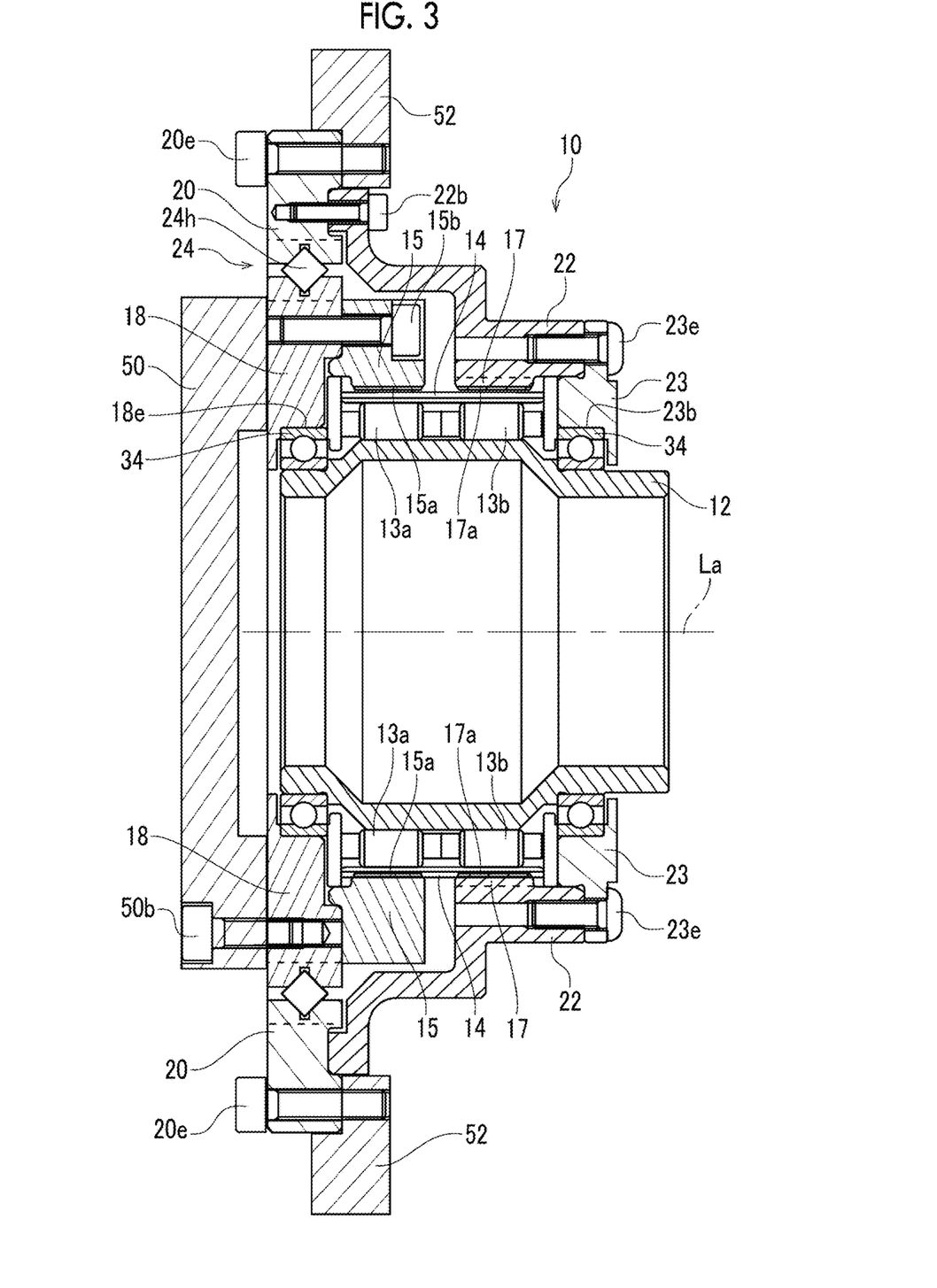
FIG. 3 is a side sectional view showing a reduction gear of a second embodiment.

Next, a configuration of a reduction gear 10 of a second embodiment will be described. In drawings and descriptions of the second embodiment, the same reference numerals are assigned to the same or equivalent constituent elements and members as those of the first embodiment. Descriptions overlapping with those of the first embodiment are appropriately omitted, and configurations different from those of the first embodiment are mainly described. FIG. 3 is a side sectional view showing the reduction gear 10 of the second embodiment and corresponds to FIG. 1.

In the first embodiment, the example in which the reduction gear is the eccentrically oscillating type gear device is described as an example. In the present embodiment, the reduction gear is a so-called wave type gear device (bending meshing type gear device) which uses a differential between an ellipse and a perfect circle. In the present embodiment, the reduction gear 10 mainly include the input shaft 12, a first wave generating unit 13a, a second wave generating unit 13b, an external gear 14, a first internal gear 15, a second internal gear 17, the first member 18, the second member 20, the main bearing 24, the casing 22, and the cover portion 23.

The first internal gear 15 and the second internal gear 17 mesh with the external gear 14. The first internal gear 15 and the second internal gear 17 are collectively referred to as an internal gear. The first member 18 synchronizes with a rotation of the first internal gear 15. The second member 20 synchronizes with a rotation of the second internal gear 17. The main bearing 24 is disposed between the first member 18 and the second member 20. One of the first member 18 and the second member 20 is connected to the driven member 50 and the other is connected to the external member 52. In the example of FIG. 3, the first member 18 is connected to the driven member 50 and the second member 20 is connected to the external member 52. In the present embodiment, the cover portion 23 is fixed to a side portion on the input side of the casing 22 by bolts 23e.

In the present embodiment, the input shaft 12 is a hollow cylindrical member, an input side thereof is supported by the input shaft bearing 34 disposed in the cover portion 23, and a counter input side thereof is supported by the input shaft bearing 34 disposed in the first member 18. An outer ring of the input shaft bearing 34 on the input side is accommodated in the recess 23b provided in the cover portion 23. An outer ring of the input shaft bearing 34 on the counter input side is accommodated in a recess 18e provided in the first member 18.

The first wave generating unit 13a and the second wave generating unit 13b each having an elliptical outer peripheral surface are provided on an outer periphery of the input shaft 12. The first wave generating unit 13a and the second wave generating unit 13b are collectively referred to as a wave generating unit. The wave generating unit is fitted into an inside of a body of the external gear 14. The wave generating unit abuts against the inside of the external gear to radially bent the external gear so as to partially mesh with the internal gear, and moves a meshing position between the internal gear and the external gear 14 in the circumferential direction. In the present embodiment, the first wave generating unit 13a moves the meshing position between the external gear 14 and the first internal gear 15 in the circumferential direction, and the second wave generating unit 13b moves a meshing position between the external gear 14 and the second internal gear 17 in the circumferential direction. The second wave generating unit 13b of FIG. 3 is disposed on the input side of the first wave generating unit 13a. The first wave generating unit 13a has a wave generator which is provided in the input shaft 12 and has an approximately elliptical outer peripheral shape and a first wave generator bearing which is disposed between the wave generator and the external gear 14. The second wave generating unit 13b is a wave generator common to the first wave generating unit 13a and a second wave generator bearing which is disposed between the wave generator and the external gear 14.

The external gear 14 is disposed inside the internal gear and has external teeth on an outer peripheral surface which is radially bent when the wave generating unit abuts against the external gear 14. The first internal gear 15 meshes with external teeth, which are bent by the first wave generating unit 13a, of the external teeth of the external gear 14. The second internal gear 17 meshes with external teeth, which are bent by the second wave generating unit 13b, of the external teeth of the external gear 14. In FIG. 3, the second internal gear 17 is disposed on the input side of the first internal gear 15. The first internal gear 15 is a hollow disk-shaped member and internal teeth 15a are integrally provided on an inner peripheral surface of the first internal gear 15. The second internal gear 17 is a hollow disk-shaped member and internal teeth 17a are integrally provided on an inner peripheral surface of the second internal gear 17. In the present embodiment, the number of teeth of the first internal gear 15 is the same as the number of teeth of the external gear 14, and the number of teeth of the second internal gear 17 is two more than the number of teeth of the external gear 14. The numbers of teeth of the first internal gear 15 and the second internal gear 17 may be changed according to the desired characteristics.

The first member 18 is a hollow annular member to which power from the first internal gear 15 is transmitted. In the present embodiment, a side portion on the input side of the first member 18 is fixed to a side portion on the counter input side of the first internal gear 15 by a bolt 15b. According to this configuration, the first member 18 moves in synchronization with the rotation of the first internal gear 15.

The casing 22 is a hollow cylindrical member which is integrally formed with the second internal gear 17, connects the second internal gear 17 and the second member 20 to each other, and transmits power from the second internal gear 17 to the second member 20. In the present embodiment, the second member 20 is a hollow annular member which is disposed radially outside the first member 18 and is fixed to a side on the counter input side of the casing 22 by the bolt 22b. According to this configuration, the second member 20 moves in synchronization with the rotation of the second internal gear 17.

In the example of FIG. 3, the driven member 50 is fixed to the side portion on the counter input side of the first member 18 by the bolt 50b, and the external member 52 is fixed to the side portion on the input side of the second member 20 by the bolt 20e.

An operation of the reduction gear 10 of the second embodiment having the above-described configuration will be described. If the rotation power is transmitted from the drive device to the input shaft 12, the first wave generating unit 13a and the second wave generating unit 13b which are provided on the outer periphery of the input shaft 12 rotate. If the first wave generating unit 13a and the second wave generating unit 13b rotate, the external gear 14 is bent in the radial direction and partially meshes with the internal gear, and thus, a meshing position between the internal gear and the external gear 14 moves in the circumferential direction. In this case, the second internal gear 17 and the external gear 14 rotate relative to each other by a difference in the numbers of teeth therebetween. Specifically, the external gear 14 rotates. Meanwhile, the first internal gear 15 has the same number of teeth as that of the external gear 14, and thus, a relative rotation therebetween is not generated, and the first internal gear 15 and the external gear 14 integrally rotate with each other. That is, the rotation (decelerated rotation) of the external gear 14 is output from the first internal gear 15. As a result, a decelerated rotation is transmitted from the first internal gear 15 to the driven member 50 via the first member 18.

In the reduction gear 10 of the present embodiment, the first member 18, the second member 20, and the main bearing 24 are formed of a material having a larger Young's modulus and larger specific gravity than those of a material constituting the first internal gear 15 and the second internal gear 17. In this example, the first member 18, the second member 20, the main bearing 24, the input shaft 12, the first wave generating unit 13a, the second wave generating unit 13b, and the external gear 14 are formed of an iron-based material. Specifically, the first member 18, the second member 20, and the main bearing 24 are formed of bearing steel (for example, SUJ2), and the input shaft 12, the first wave generating unit 13a, the second wave generating unit 13b, and the external gear 14 are formed of carburized steel.

Moreover, in this example, the first internal gear 15, the second internal gear 17, the casing 22, and the cover portion 23 are formed of a resin such as PEEK. The iron-based material has ten times or more the Young's modulus and three times or more the specific gravity compared to those of the resin. The second embodiment has the same operation and effect as those of the first embodiment. Hereinbefore, the second embodiment is described.

Hereinbefore, the examples of the embodiments of the present invention are described. The above-described embodiments are merely specific examples for implementing the present invention. The contents of the embodiments do not limit the technical scope of the present invention, and many design changes such as modifications, additions, and deletions of constituent elements can be made within a scope which does not depart from the concept of the invention defined by the claims. In the above-mentioned embodiments, although the description of "of the embodiment", "in the embodiment" or the like is given with respect to the contents which can be changed in design as described above, the design changes can be applied to contents without the notation. Moreover, hatching attached to the cross section of the drawing does not limit a material of a hatched object.

Hereinafter, a modification example will be described. In descriptions and drawings of the modification example, the same reference numerals are assigned to the same or equivalent constituent elements and members as those of the embodiments. Descriptions overlapping with those of the embodiments are appropriately omitted, and configurations different from those of the first embodiment are mainly described.

MODIFICATION EXAMPLE

In the descriptions of the first embodiment, the eccentrically oscillatingly type gear device in which the reduction gear is a so-called center crank type reduction gear is described as an example. However, the reduction gear of the present embodiment is not limited to this. The reduction gear may be a so-called distribution type eccentrically oscillating gear device in which a plurality of crankshafts are disposed at positions offset from an axis of the internal gear.

In the descriptions of the first embodiment, the example in which two external gears 14 are provided is described. However, the present invention is not limited to this. Three or more external gears 14 may be provided. For example, in the input shaft, three eccentric portions 12a having phases shifted by 120° may be provided, and three external gears 14 which are oscillated by the three eccentric portions 12a may be provided. Moreover, one external gear 14 may be provided.

In the descriptions of the first embodiment, the example is described in which the inner ring of the main bearing 24 is integrated with the first member 18 and the outer ring integrated with the second member 20. However, the present invention is not limited to this. The inner ring and the outer ring of the main bearing 24 may be a member which is separately formed from the first member 18 and the second member 20.

In the descriptions of the first embodiment, the example is described in which the input shaft bearing 34 is the ball bearing having a ball-shaped rolling elements. However, the present invention is not limited to this. A portion or all of the bearing may be a roller bearing having a cylindrical rolling elements.

In the descriptions of the first embodiment, the example is described in which the output member is the first member 18 and the fixed member is the second member 20. However, the present invention is not limited to this. The fixed member may be the first member 18 or the output member may be the second member 20.

In the descriptions of the first embodiment, the example is described in which the end portion on the input side of the inner pin 40 is not supported. The present invention is not limited to this. A member which supports the end portion on the input side of the inner pin 40 may be provided.

In the descriptions of the first embodiment, the example in which the third member 26 is formed of a metal is described. However, the present invention is not limited to this. The third member 26 may be formed of a resin such as PEEK.

In the descriptions of the first embodiment, the example is described, in which the third member 26 is separately formed from the first member 18, and thereafter, is connected to the first member 18. However, the present invention is not limited to this. The third member 26 is integrally formed with first member 18 in a seamless manner.

In the descriptions of the second embodiment, the example is described in which the reduction gear 10 is the wave gear device having the tubular external gear. However, the present invention is not limited to this. The reduction gear 10 may be a cup type wave gear device or a top hat type wave gear device.

The above-described modification examples have the same operation and effect as those of the above-described embodiments.

Any combination of the above-described embodiments and modification examples is used as the embodiment of the present invention. A new embodiment generated by the combinations has effects of the embodiment and the modification example to be combined.

It should be understood that the invention is not limited to the above-described embodiment, but may be modified into various forms on the basis of the spirit of the invention. Additionally, the modifications are included in the scope of the invention.

What is claimed is:
1. A reduction gear comprising:
an external gear;
an internal gear which meshes with the external gear;
an input shaft which has an eccentric body for oscillating the external gear;
a first member which is configured to synchronize with a rotation of the external gear;
a second member which is configured to synchronize with a rotation of the internal gear;
a main bearing which is disposed between the first member and the second member;
an inner pin which penetrates the external gear at a position offset radially outward from the input shaft; and
a third member which is integrated inside the first member and in which a first input shaft bearing supporting the input shaft is disposed,
wherein one of the first member and the second member is connected to a driven member and the other is fixed to an external member,
wherein the inner pin is inserted into an inner pin hole formed in the external gear with a clearance, abuts against a portion of the inner pin hole, and is connected to the first member,
wherein the first member, the second member, and the main bearing are formed of a material having a larger Young's modulus and larger specific gravity than those of a material constituting the external gear and the internal gear,
wherein the inner pin is formed of a material having a rigidity higher than that of the external gear, and
wherein the third member is formed of a material having smaller specific gravity than that of the material constituting the first member.

2. The reduction gear according to claim 1,
wherein the material constituting the first member, the second member, and the main bearing has ten times or more the Young's modulus and three times or more the specific gravity compared to those of the material constituting the external gear and the internal gear.

3. The reduction gear according to claim 1,
wherein the first member, the second member, the main bearing, and the inner pin are formed of an iron-based material, and the external gear and the internal gear are formed of a resin.

4. The reduction gear according to claim 1,
wherein the third member is formed of a material having larger specific gravity and a higher thermal conductivity than those of the material constituting the external gear.

5. The reduction gear according to claim 1,
wherein the inner pin is connected to a hole formed in the first member.

6. The reduction gear according to claim 5,
wherein the inner pin is press-fitted into and connected to the hole of the first member.

7. The reduction gear according to claim 1,
wherein the second member is connected to one end portion of the internal gear in an axial direction, and
wherein the first member is arranged radially inside of the second member on one side portion of the external gear in the axial direction.

8. The reduction gear according to claim 1,
wherein the main bearing comprises a plurality of rolling elements, an inner ring which is integrally provided with the first member, and an outer ring which is integrally provided with the second member.

9. The reduction gear according to claim 8,
wherein a groove for holding the rolling elements is formed on an outer peripheral surface of the first member and an inner peripheral surface of the second member.

10. A reduction gear comprising:
an external gear;
an internal gear which meshes with the external gear;
an input shaft which has an eccentric body for oscillating the external gear;
a first member which is configured to synchronize with a rotation of the external gear;
a second member which is configured to synchronize with a rotation of the internal gear;
a main bearing which is disposed between the first member and the second member; and
an inner pin which penetrates the external gear at a position offset radially outward from the input shaft,
wherein one of the first member and the second member is connected to a driven member and the other is fixed to an external member,
wherein the inner pin is inserted into an inner pin hole formed in the external gear with a clearance, abuts against a portion of the inner pin hole, and is connected to the first member,
wherein the first member, the second member, and the main bearing are formed of a material having a larger Young's modulus and larger specific gravity than those of a material constituting the external gear and the internal gear,
wherein the inner pin is formed of a material having a rigidity higher than that of the external gear,
wherein the second member is connected to one end portion of the internal gear in an axial direction,
wherein the first member is arranged radially inside of the second member on one side portion of the external gear in the axial direction,
wherein the first member includes an opening at a radial center, and
wherein the reduction gear further comprises
a first input shaft bearing which supports the input shaft; and
a third member which is fitted into the opening of the first member and holds the first input shaft bearing.

11. The reduction gear according to claim 10,
wherein the third member comprises a collar portion which protrudes from the first member in the axial direction, and
wherein an outer peripheral surface of the collar portion is used as a spigot which is fitted with the driven member.

12. The reduction gear according to claim 10,
wherein the main bearing and the first input shaft bearing overlap when viewed in a radial direction.

13. The reduction gear according to claim 10, further comprising:
a cover portion which is connected to the other end portion of the internal gear in the axial direction and covers the other side of the external gear in the axial direction.

14. The reduction gear according to claim 13, further comprising:
a second input shaft bearing which is held by the cover portion.

15. The reduction gear according to claim 13,
wherein the cover portion is integrally formed from the other end portion of the internal gear with the same material as that of the internal gear.

* * * * *